US011972149B2

(12) United States Patent
Zilberstein et al.

(10) Patent No.: US 11,972,149 B2
(45) Date of Patent: Apr. 30, 2024

(54) STORAGE SYSTEM AND METHOD FOR OPTIMIZING HOST-ACTIVATED DEFRAGMENTATION AND PROACTIVE GARBAGE COLLECTION PROCESSES

(71) Applicant: Western Digital Technologies, Inc., San Jose, CA (US)

(72) Inventors: Einav Zilberstein, Had Hasharon (IL); Nadav Sober, Shoam (IL); Omer Katz, Beit-Itzhak (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/874,555

(22) Filed: Jul. 27, 2022

(65) Prior Publication Data

US 2024/0036764 A1 Feb. 1, 2024

(51) Int. Cl.
*G06F 3/06* (2006.01)
*G06F 12/02* (2006.01)
*G06F 16/17* (2019.01)

(52) U.S. Cl.
CPC .......... *G06F 3/0659* (2013.01); *G06F 3/0604* (2013.01); *G06F 3/0679* (2013.01); *G06F 12/0253* (2013.01); *G06F 16/1724* (2019.01)

(58) Field of Classification Search
CPC .... G06F 3/0604; G06F 3/0659; G06F 3/0679; G06F 12/0253; G06F 16/1724
See application file for complete search history.

(56) References Cited

U.S. PATENT DOCUMENTS

| | | | |
|---|---|---|---|
| 8,626,987 B2 | 1/2014 | Jung et al. | |
| 8,990,477 B2 | 3/2015 | Parker et al. | |
| 9,158,670 B1* | 10/2015 | Kang | G06F 3/0652 |
| 9,645,741 B2 | 5/2017 | Duzly et al. | |
| 9,645,742 B2 | 5/2017 | Duzly et al. | |
| 9,652,154 B2 | 5/2017 | Duzly et al. | |
| 9,658,777 B2 | 5/2017 | Duzly et al. | |
| 9,880,745 B2* | 1/2018 | Ioannou | G06F 3/0652 |
| 10,168,907 B2 | 1/2019 | Chang et al. | |
| 11,042,323 B2 | 6/2021 | Li et al. | |

(Continued)

OTHER PUBLICATIONS

C. Matsui, A. Arakawa, C. Sun and K. Takeuchi, "Write Order-Based Garbage Collection Scheme for an LBA Scrambler Integrated SSD," in IEEE Transactions on Very Large Scale Integration (VLSI) Systems, vol. 25, No. 2, pp. 510-519, Feb. 2017, doi: 10.1109/TVLSI.2016.2594200. (Year: 2017).*

(Continued)

*Primary Examiner* — Eric T Oberly
(74) *Attorney, Agent, or Firm* — Crowell & Moring LLP

(57) ABSTRACT

A storage system is provided that performs a defragmentation operation or proactive garbage collection in its memory based on a command from a host. The command specifies which blocks in the memory should take part in the defragmentation operation by specifying a maximum amount of valid data that a block can have to qualify for defragmentation. That way, the storage system only performs defragmentation on those blocks that meet the validity criteria provided by the host. This can help improve performance of the storage system while reducing the degree of negative tradeoffs that may come with defragmentation or proactive garbage collection.

20 Claims, 7 Drawing Sheets

(56) References Cited

U.S. PATENT DOCUMENTS

| | | | |
|---|---|---|---|
| 2014/0032817 A1* | 1/2014 | Bux | G06F 12/0261 |
| | | | 711/E12.008 |
| 2017/0220292 A1* | 8/2017 | Hashimoto | G06F 3/0665 |
| 2018/0024921 A1 | 1/2018 | Kanno | |
| 2020/0133843 A1 | 4/2020 | Muchherla et al. | |
| 2020/0264985 A1 | 8/2020 | Lee | |
| 2020/0293441 A1* | 9/2020 | Lin | G06F 13/1694 |
| 2021/0389876 A1 | 12/2021 | Muthiah | |
| 2021/0397367 A1* | 12/2021 | Kang | G06F 12/0246 |
| 2022/0100650 A1 | 3/2022 | Lai et al. | |
| 2023/0195362 A1* | 6/2023 | Bi | G06F 3/0679 |
| | | | 711/154 |

OTHER PUBLICATIONS

U.S. Appl. No. 17/558,014, filed Dec. 21, 2021 entitled "Storage System and Method for Quantifying Storage Fragmentation and Predicting Performance Drop."

U.S. Appl. No. 17/558,089, filed Dec. 21, 2021 entitled "Storage System and Method for Optimizing Write-Amplification Factor, Endurance, and Latency During a Defragmentation Operation."

U.S. Appl. No. 17/559,327, filed Dec. 22, 2021 entitled "Storage System and Method for Non-Blocking Coherent Rewrites."

U.S. Appl. No. 17/865,641, filed Jul. 15, 2022 entitled "Management of Host File-System Defragmentation in a Data Storage Device."

\* cited by examiner

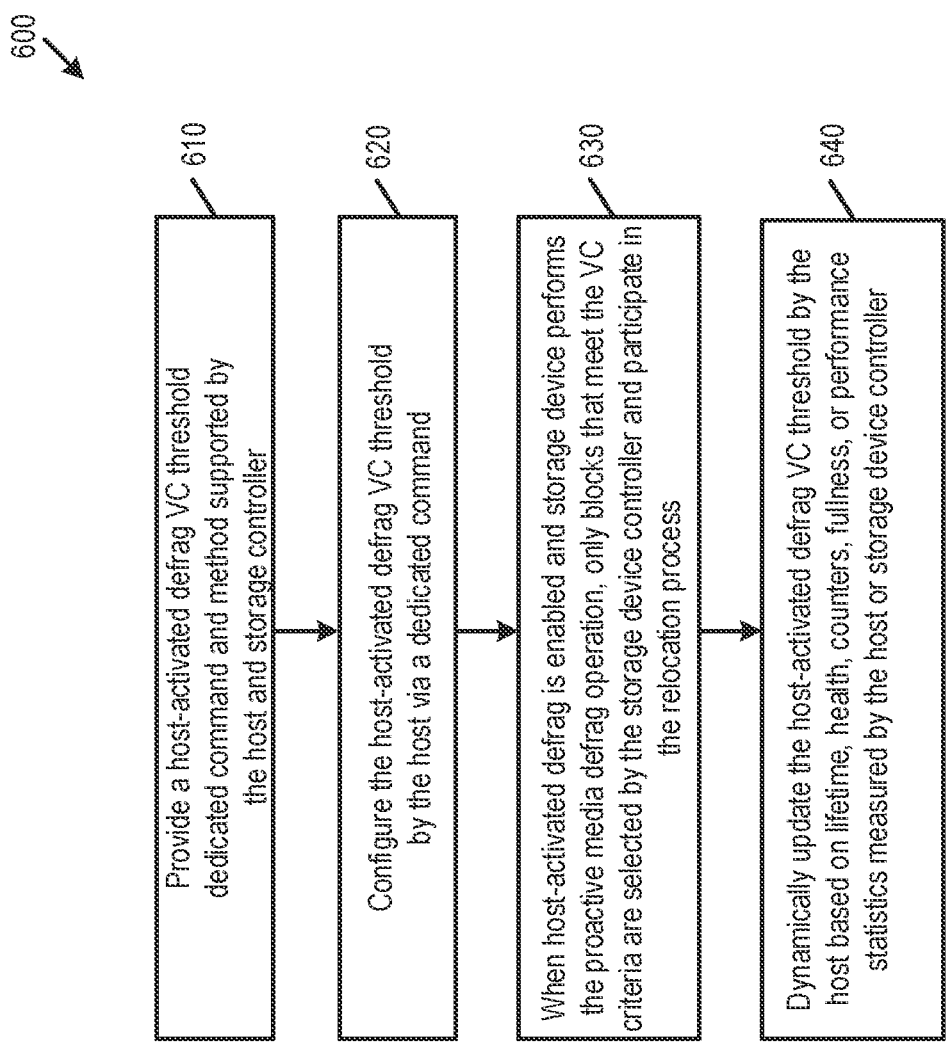

STORAGE SYSTEM AND METHOD FOR OPTIMIZING HOST-ACTIVATED DEFRAGMENTATION AND PROACTIVE GARBAGE COLLECTION PROCESSES

BACKGROUND

One challenge for the mobile and consumer industries that many original equipment manufacturers (OEMs) and data storage device vendors try to resolve is keeping the data storage device at a consistent high performance as the host (e.g., phone or laptop) is used and ages (e.g., after more than one year in the field). One of the main reasons for the degradation in performance observed in data storage devices over time relates to physical fragmentation in the memory, which can be the result of continuous usage of the memory where many files are being written and some of them erased. Over time, this usage leads to a condition where memory blocks are occupied with only partial, valid data, and there are no free blocks in the memory. In this situation, any host write command may suffer from severe performance degradation if relocation of memory blocks is done in the foreground during the host write. Host-activated defragmentation and proactive garbage collection processes can be used to solve this problem, where the data storage device can perform defragmentation in idle time to relocate valid data and assure there are enough free blocks in the memory to absorb incoming host writes.

BRIEF DESCRIPTION OF THE DRAWINGS

FIG. 6 is a flow chart of a method of an embodiment for optimizing host-activated defragmentation and proactive garbage collection processes.

DETAILED DESCRIPTION

The following embodiments generally relate to a storage system and method for optimizing host-activated defragmentation and proactive garbage collection processes. In one embodiment, a storage system is provided comprising a memory and a controller. The controller is configured to receive, from a host, a command to perform proactive defragmentation on the memory, wherein the command specifies a maximum block valid count threshold; and perform defragmentation only to those blocks in the memory whose amount of valid data is not greater than the maximum block valid count threshold. In another embodiment, a method is provided comprising: receiving, from a host, a command to perform proactive defragmentation on the memory, wherein the command specifies a valid count criteria; and performing defragmentation only on those blocks in the memory that satisfy the valid count criteria. In yet another embodiment, a storage system is provided comprising: a memory; means for receiving, from a host, a command to perform proactive defragmentation on the memory, wherein the command specifies a maximum block valid count threshold; and means for performing defragmentation only to those blocks in the memory whose amount of valid data is not greater than the maximum block valid count threshold. Other embodiments are provided and can be used alone or in combination.

Figure 1A:
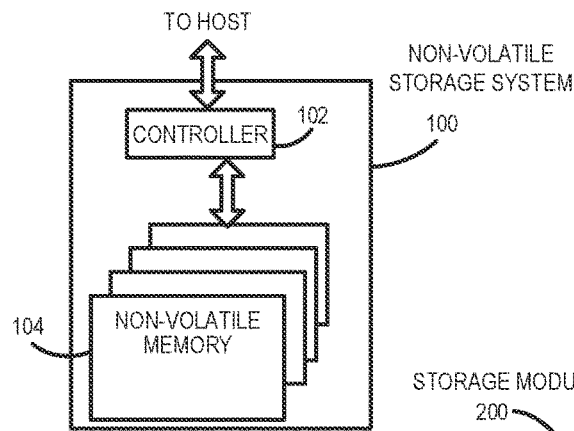
FIG. 1A is a block diagram of a non-volatile storage system of an embodiment.
Figure 1B:
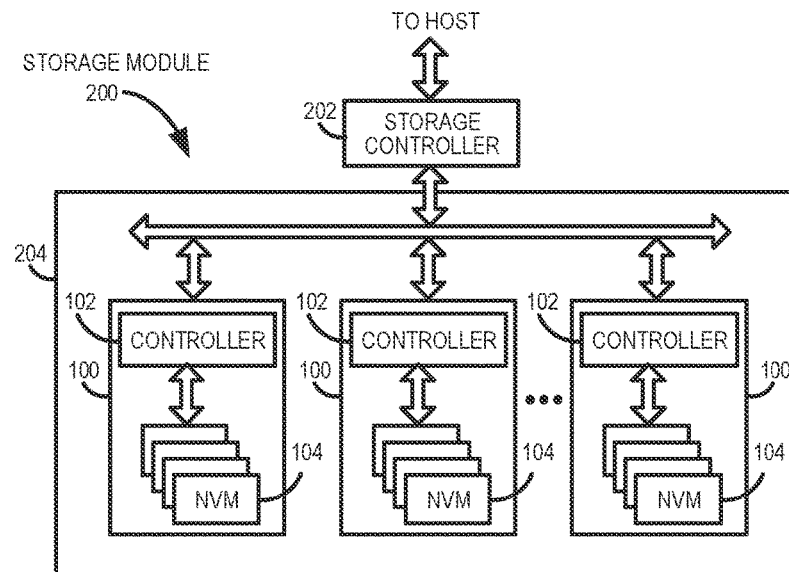
FIG. 1B is a block diagram illustrating a storage module of an embodiment.
Figure 1C:
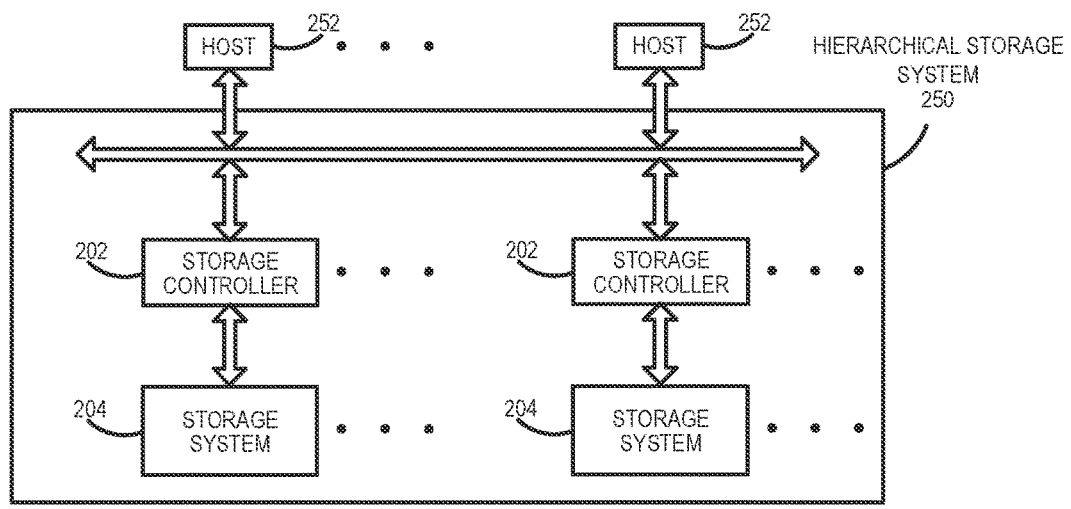
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device, data storage device, or just device) according to an embodiment of the subject matter described herein. Referring to FIG. 1A, non-volatile storage system 100 (sometimes referred to herein as a data storage device) includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
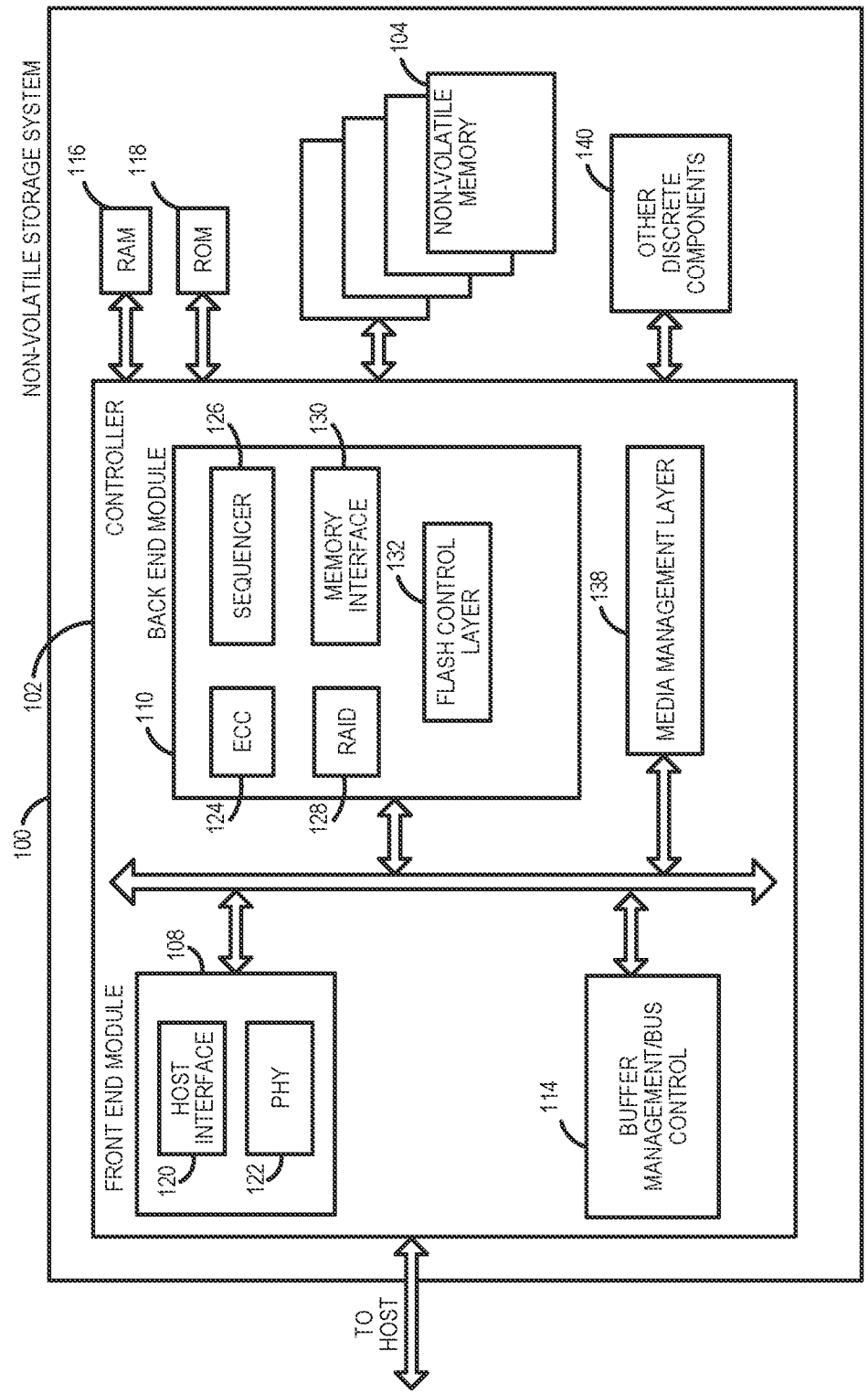
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
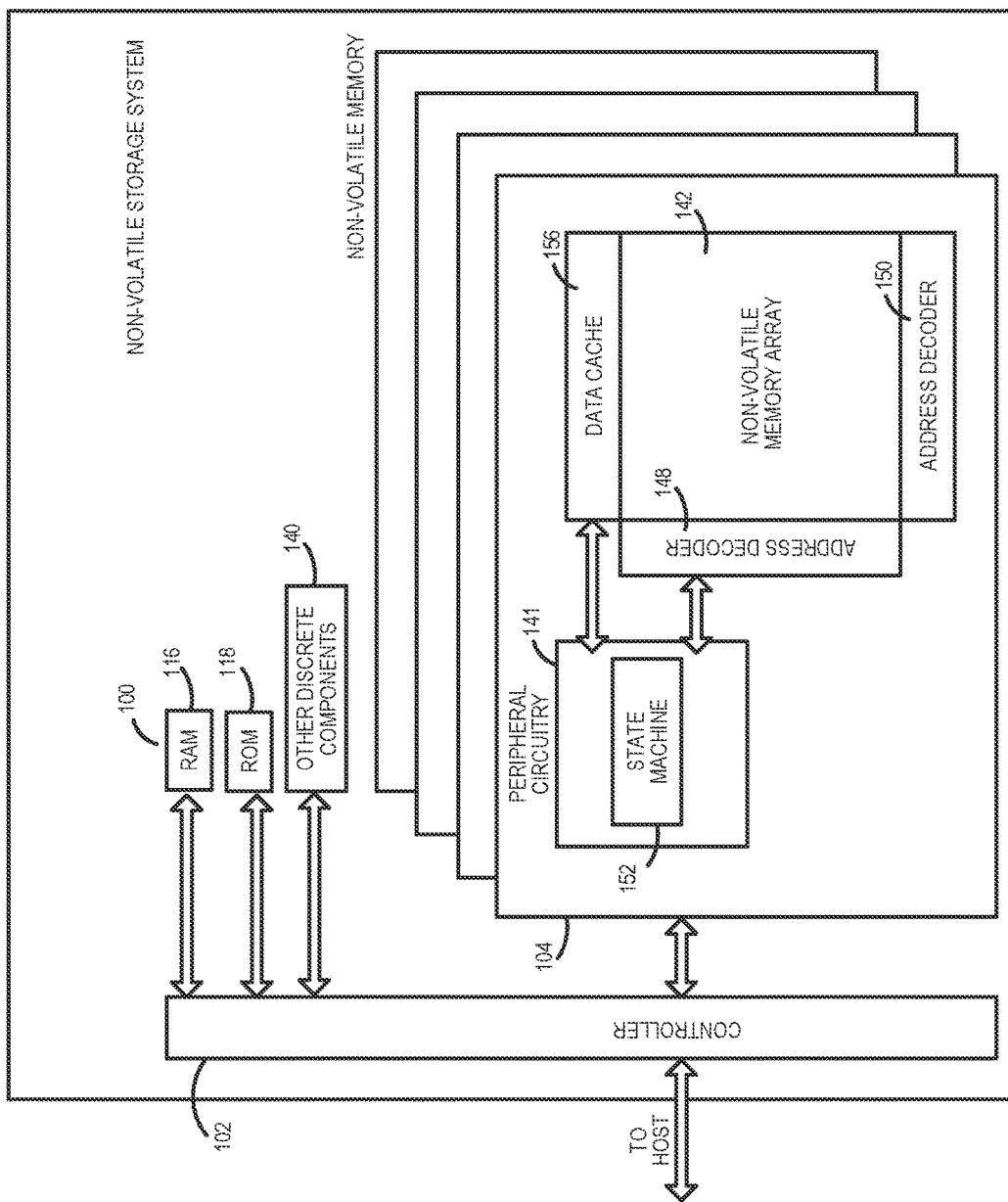
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
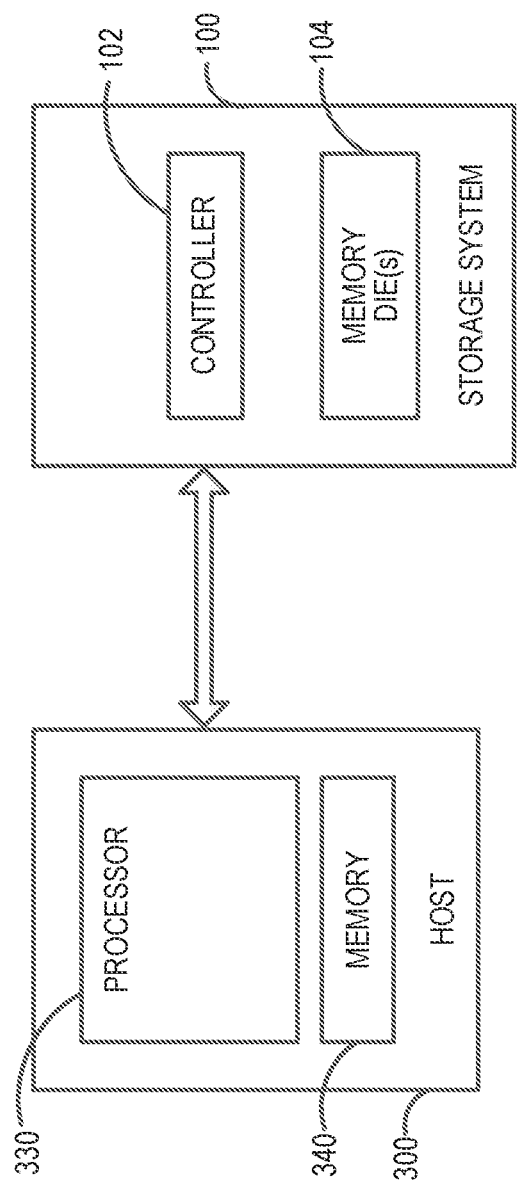
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, one challenge for the mobile and consumer industries that many original equipment manufacturers (OEMs) and data storage device vendors try to resolve is keeping the data storage device at a consistent high performance as the host (e.g., phone or laptop) is used and ages (e.g., after more than one year in the field). One of the main reasons for the degradation in performance observed in data storage devices over time relates to physical fragmentation in the memory, which can be the result of continuous usage of the memory where many files are being written and some of them erased. Over time, this usage leads to a condition where memory blocks are occupied with only partial, valid data, and there are no free blocks in the memory. In this situation, any host write command may suffer from severe performance degradation if relocation of memory blocks is done in the foreground during the host write. Host-activated defragmentation and proactive garbage collection processes can be used to solve this problem. In these processes, the data storage device can perform defragmentation to proactively relocated valid data in idle time to assure there are enough free blocks in the memory to absorb incoming host writes.

However, proactive relocation may be destructive to the write amplification factor (WAF) and the lifetime of the memory when it is triggered excessively. For example, in one approach, memory defragmentation is initiated on any block/memory/media condition to optimize the memory for maximum performance benefit until the memory reaches (or is close to) its "end of life" threshold, after which the defragmentation feature is permanently disabled. However, this approach may wear out the memory very quickly and remove any optimization option from the host permanently without allowing the host the option to fine-tune the behavior gradually and control the scenarios where performance optimization is actually needed/required. As another example, the defragmentation feature can be set to trigger relocation only on very-specific block conditions with a minimum threshold in order to maximize and protect the life of the memory. However, in this case, the performance benefit of this feature may not be seen or may not be significant enough.

Figure 4:
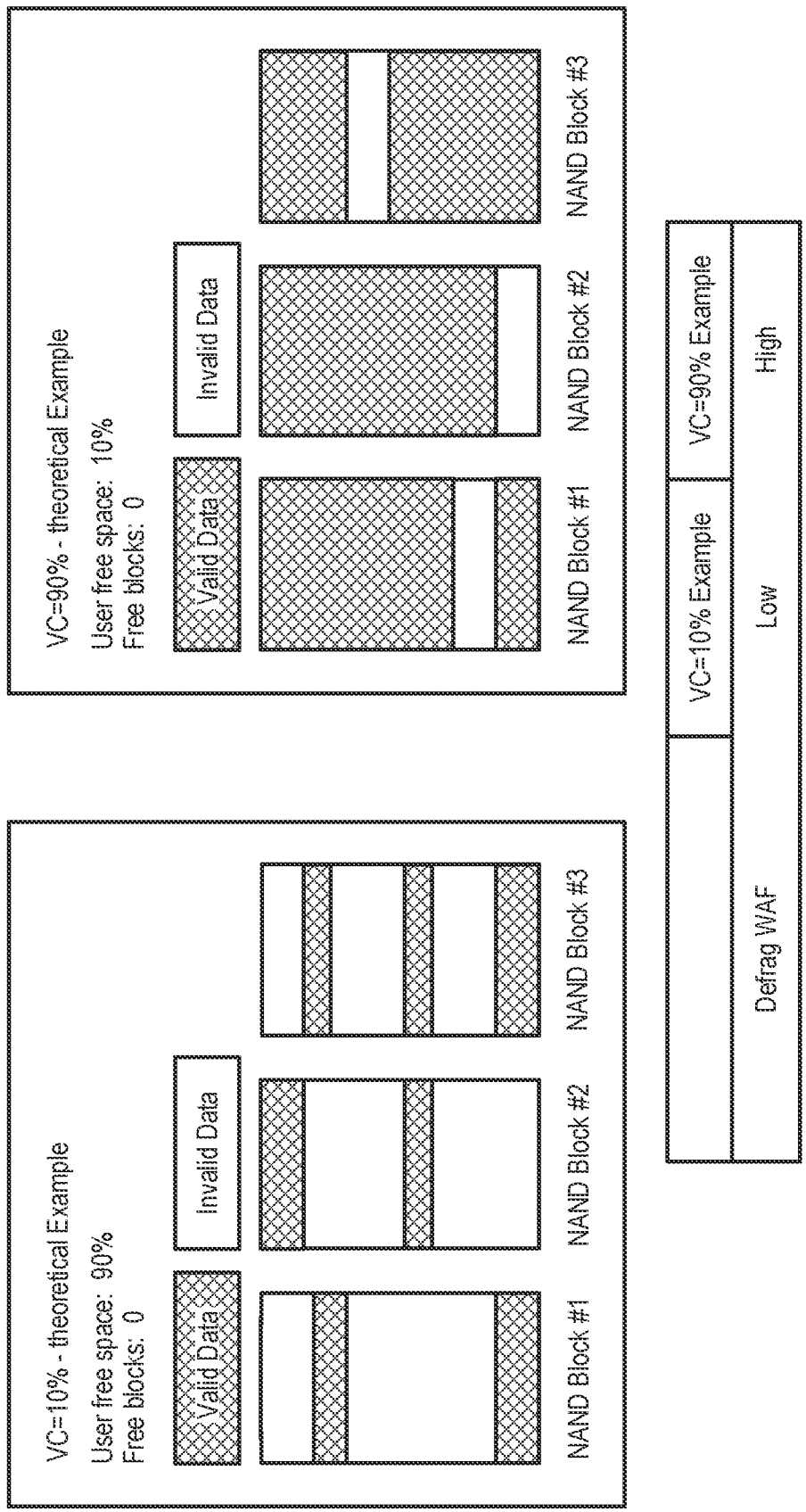
FIG. 4 is a diagram of different fragmentation levels of an embodiment.

The following embodiments provide a command and method that allows the host to dynamically control the block conditions/threshold that will participate in the memory defragmentation and, in this way, can optimize performance, WAF, and lifetime targets. The term "defragmentation" is being used herein to refer to any proactive relocation process of moving valid data from one physical location to another physical location in the memory. As such, "defragmentation" can be used to refer generally to the reduction of logical randomization of data in the physical memory space or more specifically to the scatter-gather copy of valid data in order to consolidate free space ("garbage collection"). That is "defragmentation" can refer to defragmentation and/or to proactive garbage collection processes. In one embodiment, the block condition threshold is defined and controlled via a block valid count (VC), where VC=% of valid data within a physical data block. (While valid count is typically used with garbage collection and may or may not be indicative of logical fragmentation generally, valid count is relevant to defragmentation, as that term is used herein.) As shown in FIG. 4, the "zero/no free blocks" condition may be a result of different block VC conditions. One example is where VC=10%. From the user's perspective, the free space is 90%, but there are no free blocks internally on the physical memory. Another example is where VC=90%. From the user's perspective, the free space is 10%, but there are also no free blocks in the physical memory.

In the VC=90% example, the amount of data that would need to be relocated for the purpose of freeing one new memory block will be nine times more than if the VC<=10%. Therefore, initiating the memory defragmentation process on VC<=10% can be much more relaxed on the memory's lifetime and the WAF. However, if the defragmentation operation is limited to occur only on blocks with VC<=10%, there may be many scenarios and media conditions that will not be covered by that process. With a threshold of VC<=90%, for example, almost all possible scenarios and media conditions may be covered, optimizing the data storage device to provide the best performance experience. However, in this situation, the memory may wear out. So, the higher the VC, the more data is relocated during defragmentation, which results in a higher WAF. Also, the higher the VC, the more scenarios/media conditions are optimized, which can lead to better performance and a guaranteed user experience.

In one embodiment, the block valid count (VC) condition for defragmentation can be set and dynamically configured (which is indicative of which blocks will participate in the defragmentation process). The threshold values/levels can be set by the host 300 via a dedicated command (referred to herein as the "host-activated defragmentation VC threshold configure command") and can vary from 0 VC (meaning no defragmentation will occur regardless of the condition) to a maximum size supported by the data storage device (e.g., up to a VC of 90%). The larger the VC % threshold is, the more potential performance improvement is expected as more blocks will participate in the host-activated defragmentation and proactive garbage collection processes with the tradeoff of a higher WAF and a reduction in memory lifetime.

In one embodiment, the controller 102 of the storage system 100 provides the host 300 with an attribute that indicates support of the defragmentation VC threshold configure command and, optionally, an attribute that reflects the amount of maximum VC % threshold support that can be set by the host 300 via the command. Additional attributes may reflect the storage system's recommendation for a VC % threshold value based on, for example, internal lifetime, fullness, and patterns statistics captured by the controller 102. Additional attributes can be provided regarding the number of blocks/payload expected to relocate in the defragmentation process per each possible VC value, which can allow the host 300 to predict the potential impact on WAF of each of the possible VCs.

Based on these attribute(s), the host 300 sends the dedicated host-activated defragmentation VC threshold configure command to the storage system 100 to set the maximum VC % value of blocks that can participate in the defragmentation feature. The resolution of the configured VC can be very precise (e.g., in the resolution of 1%) but can also set with larger ranges/levels (e.g., supporting only three VC levels, such as <=10%, <=50%, <=90%). Additional parameters in the command can indicate a storage internal pool to apply the VC threshold to (assuming more than one storage pool is used).

Figure 5:
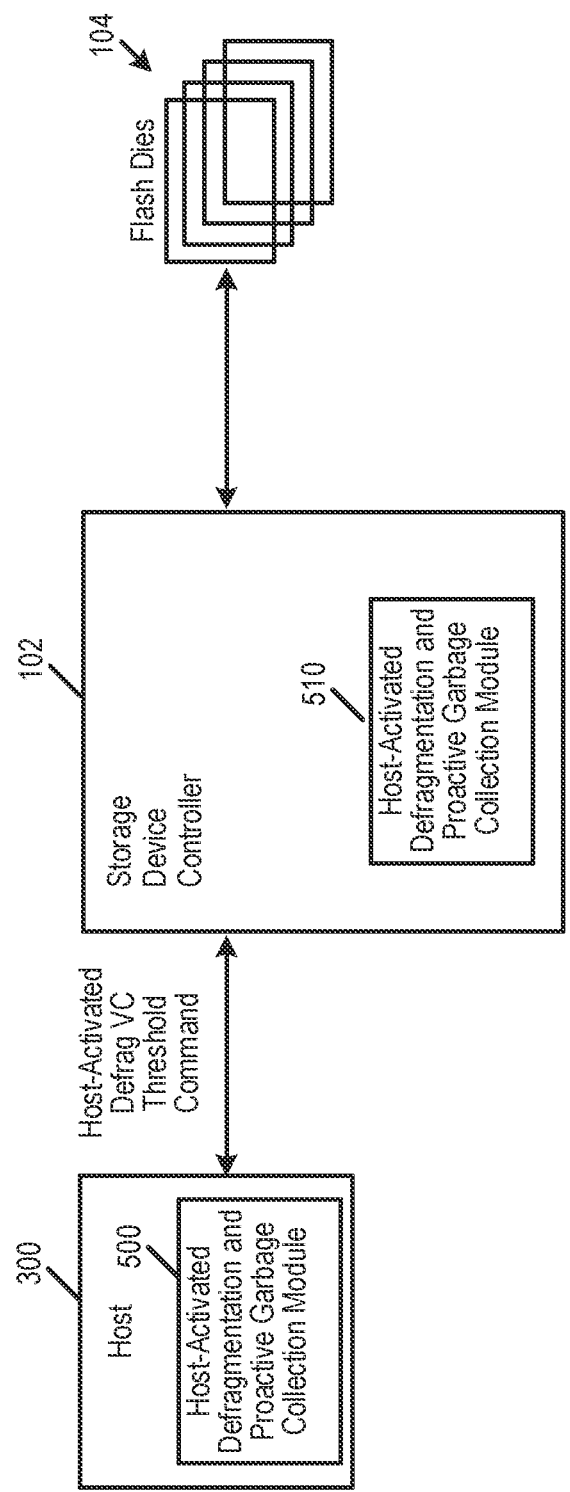
FIG. 5 is a diagram of different fragmentation levels of an embodiment.

In response to receiving the command, the controller 102 of the storage system 100 performs memory defragmentation during idle time only when enabled by the host 300 and selects the proactive defragmentation process blocks that meets the specified VC criteria. The dedicated host-activated defragmentation VC threshold configure command can be sent many times during the storage lifetime and change the VC threshold dynamically. As shown in FIG. 5, the host-activated defragmentation VC threshold command and mechanism can be implemented by a host-activated defragmentation control module 500 in the host 300, and a host-activated defragmentation control module 510 in the controller 102 of the storage system 100. These modules 500, 510 can be used to perform the method shown in the flow chart 600 in FIG. 6. As shown in FIG. 6, a host-activated defragmentation VC threshold dedicated command and method is provided that is supported by both the host 300 and the controller 102 of the storage system 100 (act 610). The VC threshold is configured by the host 300 (act 620). The controller 102 then selects only those blocks that meet the VC criteria during the proactive relocation process (act 630). After that, the host 300 can dynamically update the VC threshold based on, for example, lifetime, health, counters, fullness, or performance statistics measured by the host 300 or by the controller 102 of the storage system 100 (act 640).

In one embodiment, the host 300 can apply simple learning techniques of the pattern and system behavior and update or modify the host-activated defragmentation VC threshold accordingly. In one example, the host 300 can set, at the beginning of the memory's lifetime, a very-aggressive threshold and then reduce this threshold gradually as memory's lifetime progresses. In another example, the host 300 can set this threshold to a higher value based on certain application usage that have higher priority for performance optimization.

It should be noted that above-described mechanism to dynamically configure the VC threshold for choosing candidate blocks for relocation may be applicable to features in addition to or instead of the host-activated defragmentation feature. For example, these embodiments can be used to dynamically set VC thresholds that are applied to the general garbage collection operations/flows running by the storage system 100 or to other features that make use of proactive relocation. These embodiments can also be used to define different VC thresholds to each of the internal storage pools in the storage system 100. For example, lower VC thresholds can be applied to a single-level cell (SLC) pool managed internally in the storage system 100 versus a larger VC threshold that would apply to a triple-level cell (TLC) pool. The dynamic configuration per pool may be helpful where the storage system 100 internally manages a few different pools, and one pool is more limited in lifetime than the other one(s). To support this, the dedicated command to configure the threshold can include another parameter that can indicate the pool number (e.g., "1" for the SLC pool, and "2" for the TLC pool).

There are many advantages associated with these embodiments. For example, these embodiments can help improve performance vs. WAF/lifetime tradeoffs for a host-activated defragmentation feature or other features that involve garbage collection/proactive relocation and adapt them dynamically per need or usage case.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
   a memory; and
   a controller coupled with the memory and configured to:
      receive, from a host, a command to perform host-activated defragmentation on the memory, wherein the command specifies a maximum block valid count threshold that is selected by the host after assessing a tradeoff between increased performance and reduction of memory lifetime associated with the maximum block valid count threshold;
      perform defragmentation only to those blocks in the memory whose amount of valid data is not greater than the maximum block valid count threshold; and receive, from the host, at least one subsequent command to perform host-activated defragmentation on the memory, wherein each subsequent command specifies a different maximum block valid count threshold;

wherein the host dynamically decreases the maximum block valid count threshold in each subsequent command as the host progressively prioritizes memory lifetime over performance.

2. The storage system of claim 1, wherein the controller is further configured to inform the host that the storage system supports the command.

3. The storage system of claim 1, wherein the controller is further configured to provide the host with an indication of a maximum block valid count threshold supported by the storage system.

4. The storage system of claim 1, wherein the controller is further configured to provide the host with a recommendation of the maximum block valid count threshold.

5. The storage system of claim 1, wherein the controller is further configured to provide the host with an indication of a number of blocks of the memory that are expected to be relocated in each of a plurality of maximum block valid count thresholds.

6. The storage system of claim 1, wherein the defragmentation is performed during an idle time of the memory.

7. The storage system of claim 1, wherein the command further indicates a storage pool in the memory to which the defragmentation operation is to be performed.

8. The storage system of claim 1, wherein the maximum block valid count threshold is based on a counter value, a memory fullness, and/or performance statistics.

9. The storage system of claim 1, wherein the memory comprises a three-dimensional memory.

10. In a storage system comprising a memory, a method comprising:
receiving, from a host, a command to perform host-activated defragmentation on the memory, wherein the command specifies a valid count criteria that is determined by host application usage after the host assesses a tradeoff between increased performance and reduction of memory lifetime associated with the valid count criteria;
performing defragmentation only on those blocks in the memory that satisfy the valid count criteria; and
receiving, from the host, at least one subsequent command to perform host-activated defragmentation on the memory, wherein each subsequent command specifies a different valid count criteria, and wherein the host dynamically decreases the valid count criteria in each subsequent command as the host progressively prioritizes memory lifetime over performance.

11. The method of claim 10, further comprising informing the host that the storage system supports the command.

12. The method of claim 10, further comprising providing the host with an indication of a maximum valid count criteria supported by the storage system.

13. The method of claim 10, further comprising providing the host with a recommendation of the valid count criteria.

14. The method of claim 10, further comprising providing the host with an indication of a number of blocks of the memory that are expected to be relocated in each of a plurality of valid count criteria.

15. The method of claim 10, wherein the defragmentation is performed during an idle time of the memory.

16. The method of claim 10, wherein the at least one subsequent command comprises a plurality of commands.

17. The method of claim 10, wherein the command further indicates a storage pool in the memory to which the defragmentation operation is to be performed.

18. The method of claim 10, wherein the valid count criteria is based on memory lifetime, memory health, a counter value, a memory fullness, and/or performance statistics.

19. A storage system comprising:
a memory;
means for receiving, from a host, a command to perform host-activated defragmentation on the memory, wherein the command specifies a selection of one of a predefined number of maximum block valid count threshold options that is selected by the host after assessing a tradeoff between increased performance and reduction of memory lifetime associated with each of the predefined number of maximum block valid count threshold options;
means for performing defragmentation only to those blocks in the memory whose amount of valid data is not greater than the selected one of the predefined number of maximum block valid count threshold options; and
means for receiving, from the host, at least one subsequent command to perform host-activated defragmentation on the memory, wherein each subsequent command specifies a different one of the predefined number of maximum block valid count threshold options, wherein the host dynamically selects a decreasing maximum block valid count threshold option in each subsequent command as the host progressively prioritizes memory lifetime over performance.

20. The storage system of claim 1, wherein the maximum block valid count threshold is based on memory health.

* * * * *